Oct. 10, 1939.　　　　A. F. BENNETT　　　　2,175,592
ATTACHMENT MOUNTING FOR A MACHINE TOOL
Filed March 17, 1936　　　8 Sheets-Sheet 1

INVENTOR.
Arthur F. Bennett
BY Barlow & Barlow
ATTORNEYS.

Oct. 10, 1939.  A. F. BENNETT  2,175,592
ATTACHMENT MOUNTING FOR A MACHINE TOOL
Filed March 17, 1936  8 Sheets-Sheet 3

INVENTOR.
Arthur F. Bennett
BY
Barlow & Barlow
ATTORNEYS.

Oct. 10, 1939.　　　A. F. BENNETT　　　2,175,592
ATTACHMENT MOUNTING FOR A MACHINE TOOL
Filed March 17, 1936　　　8 Sheets-Sheet 8

INVENTOR.
Arthur F. Bennett
BY Barlow & Barlow
ATTORNEYS.

Patented Oct. 10, 1939

2,175,592

UNITED STATES PATENT OFFICE 2,175,592

ATTACHMENT MOUNTING FOR A MACHINE TOOL

Arthur F. Bennett, West Barrington, R. I., assignor to Brown & Sharpe Manufacturing Company, a corporation of Rhode Island Application March 17, 1936, Serial No. 69,321

19 Claims. (Cl. 90—17)

This invention relates to a machine tool, and has for one of its objects the provision of an attachment which may be adjustably mounted on the side of the machine and there driven instead of clamping it onto the face of the machine in the usual manner.

Another object of the invention is the provision of a construction by which this attachment may be stored back of the face of the machine and be entirely out of the way with none of its operating parts exposed.

Another object of the invention is the arrangement of the attachment so that it may be utilized or operated at the same time that the spindle and arbor of the machine are operated in the usual manner, whereby both the attachment and the spindle may act on the work at the same time.

Another object of the invention is an arrangement whereby the attachment may be moved from the side of the machine to the position of one of the overarms with a single driving arrangement which may be utilized for the driving of the attachment in any one of the selected positions by shifting it from one position to another.

Another object of the invention is the drive of the attachment from the spindle and yet leave the spindle free at all times for doing additional work.

Another object of the invention is the covering of the operating mechanism of the attachment in its various positions of adjustment while protruding the minimum amount from the machine in these various positions and the transferring of such guard cover to different positions as the drive for the attachment is transferred to the different positions.

Another object of the invention is to provide a very rigid mounting and support for the attachment irrespective of which position is selected for its operation.

Another object of the invention is the means for alignment of the attachment when it is positioned in any one of its three selected positions that the same may have a known relation to the work table.

With these and other objects in view, the invention consists of certain novel features of construction, as will be more fully described, and particularly pointed out in the appended claims.

In the use of machine tools such as milling machines, usually an attachment is provided as a separate unit which is clamped over the spindle and is driven from the spindle, thus the usual arbor which is driven from the spindle cannot be operated at the same time that the attachment is operated, and further, to utilize the attachment it must be separately clamped in position; and in order to avoid the disadvantages attendant to such arrangement, I have provided an attachment and mounting for the same on the side of the machine where it may be operated in various positions of adjustment relative to the plane of the face of the machine; while at the same time utilizing the spindle so that both may be operated together, or the spindle may be operated without operating the attachment; and I have so arranged this attachment that it may be withdrawn from its side mounting position to be substituted for either one of the overarms and by shifting a drive unit the same mechanism may be utilized for driving the attachment in any one of the three positions; and the following is a more detailed description of the present embodiment of this invention, illustrating the preferred means by which these advantageous results may be accomplished:

With reference to the drawings, the machine tool shown for the sake of illustration as a milling machine comprises a base 20 with an upwardly extending standard 21. A suitable vertically adjustable knee 22 is provided with a reciprocating table 23. Vertical adjustment of the knee is had through the hand wheel 24, and a lateral adjustment of the table is had by means of a hand wheel 25, all in a known manner. The housed operating mechanism of the machine is driven from some suitable source of power, such for instance as an electric motor 26 which through transmission gears drive the spindle 27 in a usual and known manner. A pair of overarms 28 and 29 are provided which extend out beyond the face 31 to suspend the yoke 30 for supporting the arbor, not here illustrated, which is driven from the spindle 27.

Figure 2:
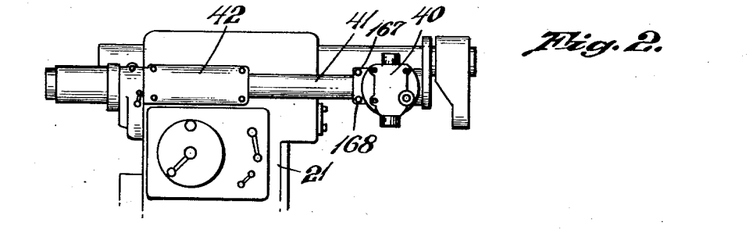
Fig. 2 is a fragmental view of the upper portion of the machine tool with the attachment drawn forwardly from the position shown in Fig. 1.

The usual attachment for a machine of this character is a separate unit positioned on the face of the machine over the spindle and driven from the working end thereof, after being clamped in position; in accordance with this invention, however, the attachment 40 is mounted on the side of the standard 21 where it may be stored back of the front face 31 of the machine, or it may be pulled forwardly axially of its drive shaft beyond the front face, as shown in Fig. 2, and in any position of adjustment driven from the spindle by means at the back end thereof while leaving the forward working end of the spindle free to be utilized in its ordinary accustomed manner so that the spindle may operate an arbor to act upon the work and the attachment may also be utilized at the same time for operation upon the work, whereby two operations may be performed simultaneously.

The attachment unit comprises a tubular housing comprising the portion 41, 41', (Fig. 9), extending rearwardly from the working end thereof which is slidably mounted in a bracket 42 fixed to the side of the standard 21 and at its end flush with the rear surface of the standard. This bracket 42 has a projecting portion 43, (Fig. 12), to fit within a recess 44 in the side of the standard 21 and there be located in position while being secured to the standard by the bolts 45 passing through the lower portion of the bracket 42 and bolts 46 passing through the upper split portion of the bracket so that the bolt 46 serves to contact the split 47 and reduce the circular opening 48 in the bracket and thereby tightly grip the tubular housing 41 and hold the attachment in the desired axial adjusted position. This bracket is cut away in its middle portion as at 49, (Fig. 9), leaving the bearing gripping portions 50 to grip the housing 41. The housing 41 is shouldered as at 51 so as to limit its insertion into the bracket 42, this limit, however, being such that the attachment does not protrude beyond face 31.

The housing 41, 41' receives a tubular member 52, (Fig. 9), which provides bearing supports for the auxiliary spindle 53 by means of its bores of several different diameters. This tubular member is held in fixed relation to the housing portion 41 by means of countersunk bolts 58 extending through the housing and into the member 52, while the portion 41' is rotatable about the member 52 to adjust the attachment spindle and is clamped in desired position by the bolts 167 and 168, (Figs. 2, 3 and 9), contacting the split end of the portion 41' to cause it to grip the member 52. One of said bearing portions is provided in the elongated bore 54 while another larger bore 55 supports suitable roller bearings 56 which in turn engage and support the attachment drive shaft 53 at a larger diameter thereof. The bore 57 between these two diameters providing clearance at the forward extremity of the drive shaft; a ball bearing 59 is mounted in the housing 41 to support a reduced portion 160 of this shaft, which bearing is located in the bore 161 and held in place by the threaded member 162 tightened by a spanner engaging openings 163 and held in place by a set screw 164. At the rear extremity of the drive shaft 53 the housing 41 provides an additional supporting bearing by means of a support member 102, (Fig. 8), having a stud 103 extending therethrough and held in position by set screw 104. This stud 103 supports roller bearing 105 which in turn egages the inner surface of the recess 106 in the end of the drive shaft. The rear end of the drive shaft 53 is provided with a long gear 60, (Fig 9), for adjustment of the shaft and this gear is driven from the spindle 27 by a train of gears which is housed in a unit which is attached to the back of the standard of the machine and movable to different positions.

Figure 7:
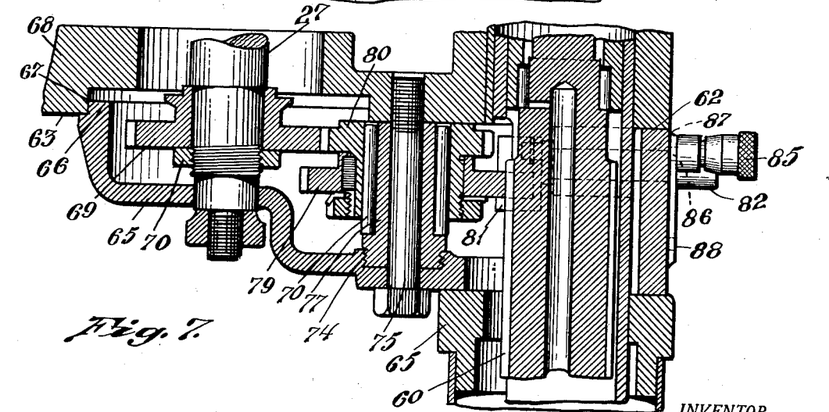
Fig. 7 is a sectional view on the line 7—7 of Fig. 6.

This unit consists of a generally cup-shaped housing or casing 65 which has its edges 64 (Fig. 9) about its open side abutting the rear surface 63 of the standard and end 62 of the bracket 42. A projecting portion 66 of the casing 65 (Fig. 7) is swivelly mounted in a recess 67 in the back wall 68 of the standard 21. This recess 67 is concentric with the axis of the spindle 27. To provide a drive for the attachment I add a gear 69 upon the spindle 27, the same being rotatable with the spindle and held in place by a nut 70 to force the gear against the shoulder 71 on the spindle. Also, this casing 65 carries a stud 77 which is threaded into the casing at 74 to be supported thereby. This stud contacts with the rear face of the standard while a bolt 75 extends through this stud and into a threaded hole 76 in the rear wall of the standard to hold the casing in the position of adjustment to drive the attachment when at the side of the machine. On this stud is rotatably mounted the roller bearing 78 which anti-frictionally supports the gears 79 and 80 to rotate together as a single unit. Gear 80 meshes with the gear 69 on the spindle 27, while the gear 79 engages the gear 60 provided on the end of the attachment drive shaft so as to drive the same. As the attachment is drawn forwardly this long gear slides along and yet at all positions maintains its driving connection with the gear 79.

When desired, the gear 80 may be withdrawn from mesh with the gear 69 so that the drive shaft 53 may be optionally rendered inoperative. A fork 81 has its arms extending along opposite sides of the gear 79, while a shaft 82 has an eccentric 83 engaging the fork so that as the shaft is swung by lever 84 and handle 85 from one position to another the shaft will be rotated to shift the gear along the roller bearing to and from mesh with the gear 69 on the main spindle. The lever 84 is held in its different position by pin 86 slidably mounted in the handle to be operated by an axial movement of the handle and is spring pressed into one of the openings 87 and 88.

Figure 1:
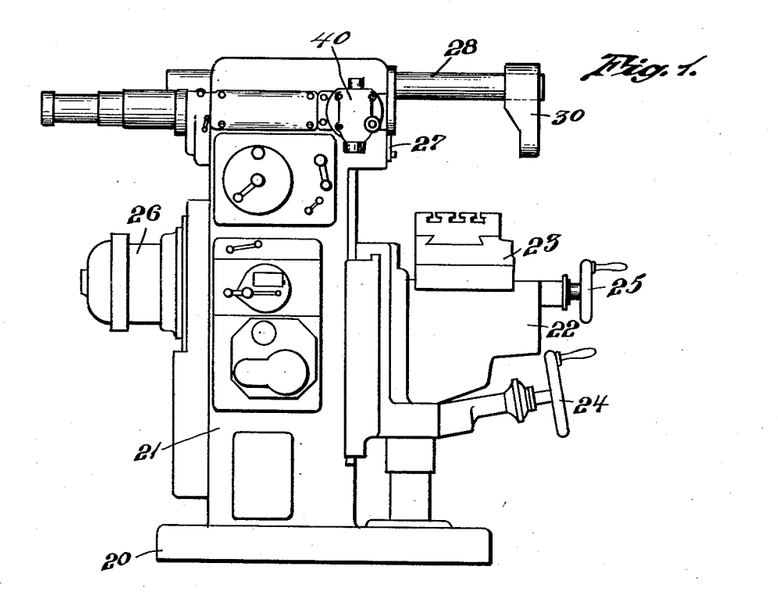
Fig. 1 is a side elevation of a machine tool with my improved attachment mounted thereon.

Extending rearwardly from this casing unit 65 are a plurality of telescopic tubes 90, 91 and 92 (Fig. 8) which are limited in their extensions by inwardly extending abutment flange 93 on the outer end of tube 90 to engage the outwardly extending abutment flange 93 on the tube 91 at its inner end; while the inwardly extending abutment flange 95 on the outer end of the tube 91 engages the outwardly extending abutment flange 96 on the inner end of tube 92. The inner end of tube 90 fits over a collar 97 to which it is bolted as at 98, while the plate 99 which supports said collar is bolted by the three screws 100 to the casing 65. A tension spring 101 tends at all times to collapse these tubes, while the tubular housing 41 forces them into extended position as the attachment is pushed to its stored position, as shown in Fig. 1.

The outermost telescopic tube 92 is provided with a closure cap 107 while through this closure, and also through stud 103 an oil conduit 108 extends. This conduit is filled through the elbow 109 to direct lubricant into the hollow axis 110 of the elongated gear 60, from which location it is distributed.

Figure 16:
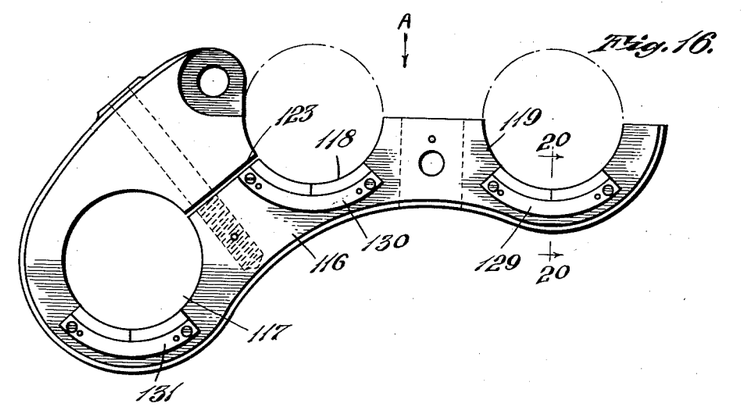
Fig. 16 is a face view of a portion of the brace plate.
Figure 17:
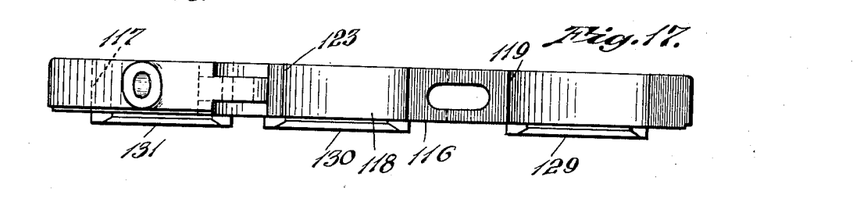
Fig. 17 is an edge view of the portion of the brace plate shown in Fig. 16 looking in the direction of arrow A.
Figures 18, 19:
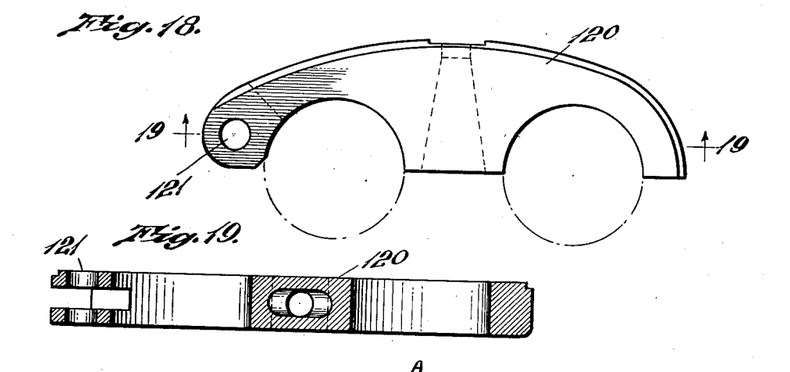
Fig. 18 is an elevational view of the cover part of the brace plate as shown separate from the main portion thereof.
Fig. 19 is a sectional view on the line 19—19 of Fig. 18.
Figure 20:
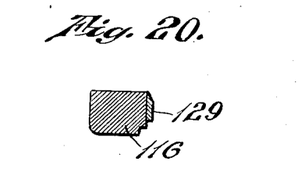
Fig. 20 is a sectional view on the line 20—20 of Fig. 16.

At the forward end of the attachment the housing 41 is reduced somewhat to provide a cylindrical surface 115 (Fig. 14) upon which a bracket for additional support is mounted. This bracket is formed in two parts 116 and 120, as shown in Figs. 16 and 18, which parts are hinged together. The two parts of this bracket provide together openings 117, 118 and 119, in which the body part 116 wholly contains the opening 117 to fit on the surface 115 on the housing 41 with a split 123 connecting these openings 117 and 118 for clamping purposes. The openings 118 and 119 receive the overarms 28 and 29 which project from the face of the machine. The cover portion 120 is swung about its hinge connection 121 to open position for the reception of these overarms. The bracket is then clamped to the attachment housing by a bolt 122 which draws the portions on either side of split 123 together to contract the size of the opening 117 and hold it tightly clamped on the housing 41. A part 120 is then swung about its hinge 121 to completely embrace the overarms 28 and 29 and is clamped in this position by an eye bolt 124 hinged as at 125 in part 116 and extending through opening 126 in part 120, while nut 127 urges the part 120 through washer 128 to cause the bracket to tightly bind the overarms. This bracket serves the additional useful purpose of aligning the attachment with reference to the work table by means of index markings 129, 130, 131 in conjunction with the end surface 132 of the housing 41 which is also graduated so that it may be known when a plane at right angles to the axis of the swivel of the attachment is perpendicular to the work table and inasmuch as the housing 41 may be swung about its axis with reference to the bracket 42, other angular relations may be also as readily obtained, it, however, being desirable that the relation of the attachment to the work table be known.

Figures 9, 10:
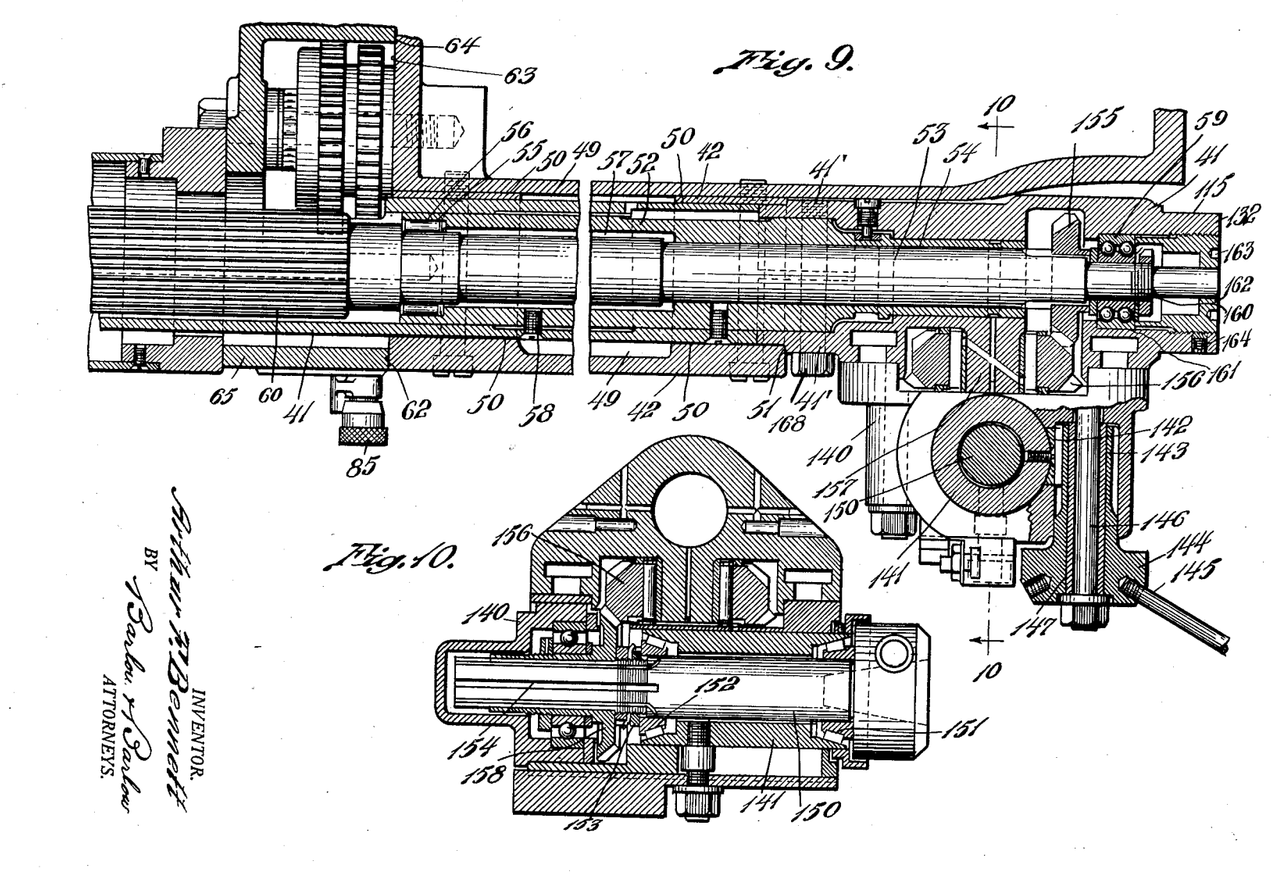
Fig. 9 is a sectional view through a part of the attachment showing the forward end thereof.
Fig. 10 is a sectional view on the line 10—10 of Fig. 9, showing the drive through the swivel portion of the attachment.

Upon the housing 41 a head 140 is swivelly mounted in a known manner and shown in Figs. 9 and 10. A sleeve 141 carrying a rack 142 is slidably mounted in this head and with which rack there meshes a pinion 143 which is rotatably mounted on a shaft 146 through bushing 147. This pinion has an integral hub 144 at one end serving as a handle with spokes 145 extending therefrom for rotating the same about the shaft 146 as an axis.

The sleeve 141 rotatably supports an attachment of auxiliary spindle 150 by means of roller bearings 151, 152 held in position by nuts 153; while the shaft at one end is provided with a spline 154 so that it may be driven and yet slide with reference to the driving means in response to the movement of the sleeve 141. This shaft 150 is driven from the drive shaft 53 through a train of bevel gears 155 on the shaft 53 meshing with the bevel gear 156 rotatably about the stub 157 having its axis at the center of the swivel head 140. This gear 156 in turn meshes with the bevel gear 158 which drives the shaft 150 and is connected thereto by means of the spline 154. These gears 156 and 158 are suitably mounted on antifriction bearings and are provided with means for lubrication, such for instance as by means of oil conduits shown through the supports for the gears.

The attachment has thus far been described in its position at the side of the machine; however, there are various other mountings for the attachment in the machine.

The housing 41 is of the same external diameter as the overarms 28 and 29 and the attachment with its housing may be completely drawn out of its bracket 42 while either one of the overarms may be drawn completely out of its position and the attachment may be interchanged with either one of the overarms. For illustrative purposes I have shown in Figs. 3 and 12 the back of the machine with the attachment in the position of the overarm most distant from the position of the attachment on the side of the machine, while in Fig. 13 is shown the attachment in the position of the overarm closest to the side position of the attachment.

Figure 12:
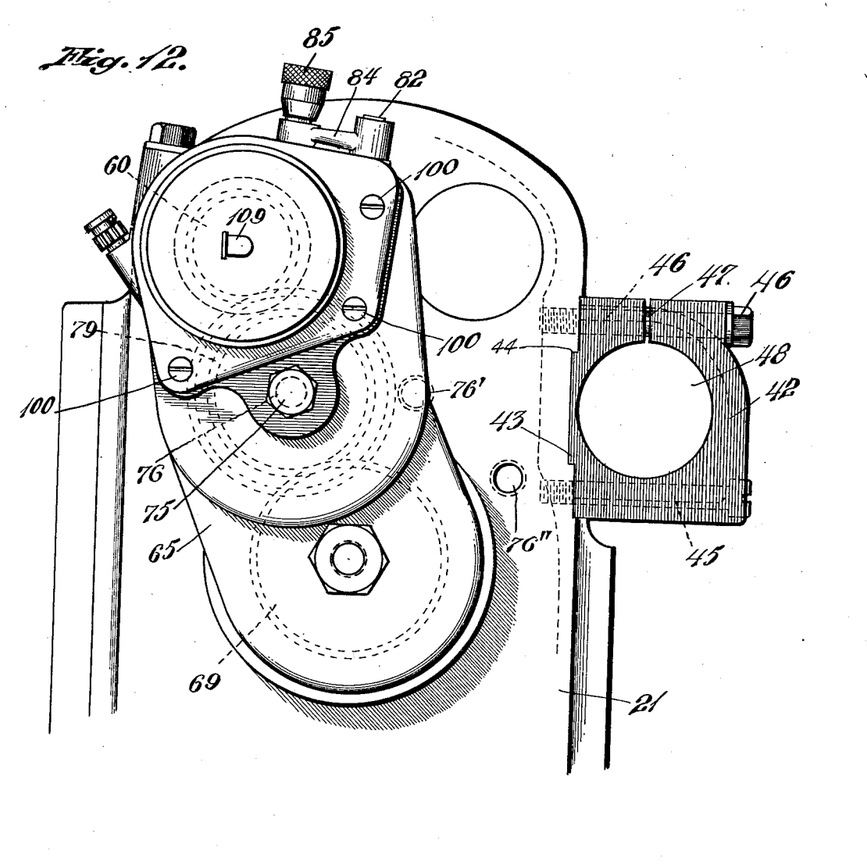
Fig. 12 is a rear view of the upper portion of the machine tool showing the drive mechanism as swung from its position in Fig. 6 to a position for driving the attachment when substituted for the overarm most distant from its side mounting position.
Figures 13, 14, 15:
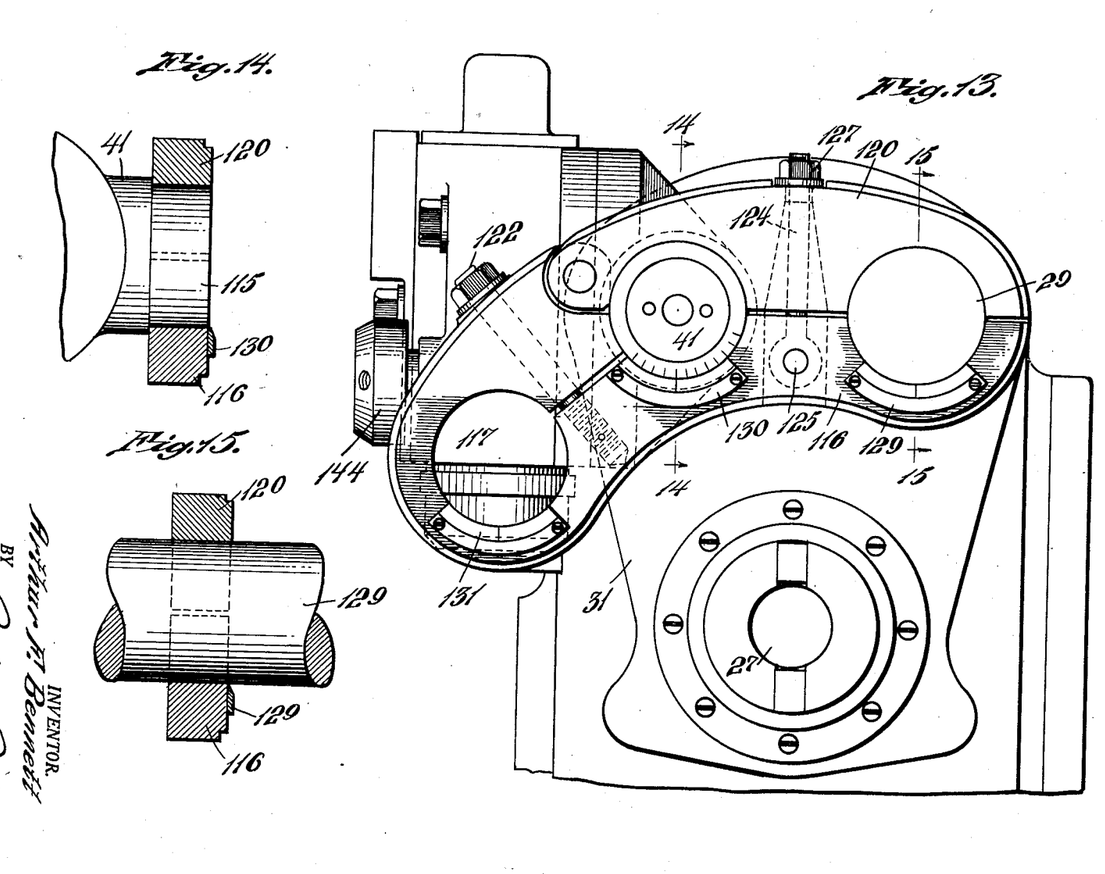
Fig. 13 is a face view of the upper portion of the machine tool, showing the attachment as mounted in the position of the overarm nearest its side mounting position.
Fig. 14 is a section on the line 14—14 of Fig. 13.
Fig. 15 is a section on the line 15—15 of Fig. 13.

When the attachment is in the position of one of the overarms the casing 65, together with its operating mechanism contained therein, is swung about the spindle as a center and the bolt 75 positioned in the tapped hole 76 in the back wall of the standard to hold the casing in the position shown in Fig. 12, or the casing may be held in another position of adjustment by bolt 75 in tapped hole 76' or 76''. The drive will then be as above described in connection with Fig. 7 from the gear 69 through the gears 80, 79 to the gear 60 on the attachment drive shaft. Thus, the same driving arrangement is provided for the position of the attachment when located in the overarm position. The telescoping covers on the unit 65 move with the casing unit to the new position at the time the casing is swung.

As for the alignment of the attachment, this is readily accomplished by reason of the graduations on the surface 132 of the housing of the attachment and the indicating markings 129, 130 or 131 which are fixed on the plate 116 with which they may be aligned. When the zero indication markings are in alignment, Fig. 5, the plane of the swivel head will be perpendicular to the work table, or when some other indications register with a datum line known angular relations may be obtained.

Figure 3:
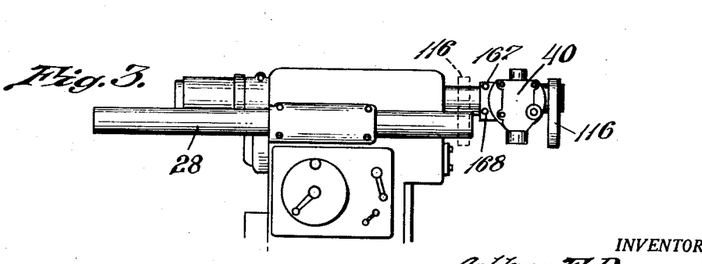
Fig. 3 is a view similar to Fig. 2 showing the attachment mounted in the position of one of the overarms.

When the attachment is in the position of the overarm 29 the overarm 28 will be slid inwardly so as not to contact with the operating parts of the attachment, and thus when in this position the brace 116 will engage the housing 41 at 115 and the overarm 29 now in the brace 42, as shown in Fig. 3, leaving the space 118 unoccupied. When the attachment is in the position of the overarm 28, as shown in Fig. 13, the overarm 28 may be placed in the bracket 42 but must be pushed back to be out of the way of the working part of the attachment and will not be engaged by the brace 116 but rather only the overarm 29 and the attachment will be engaged and the opening 117 will be unoccupied.

Figures 4, 5:
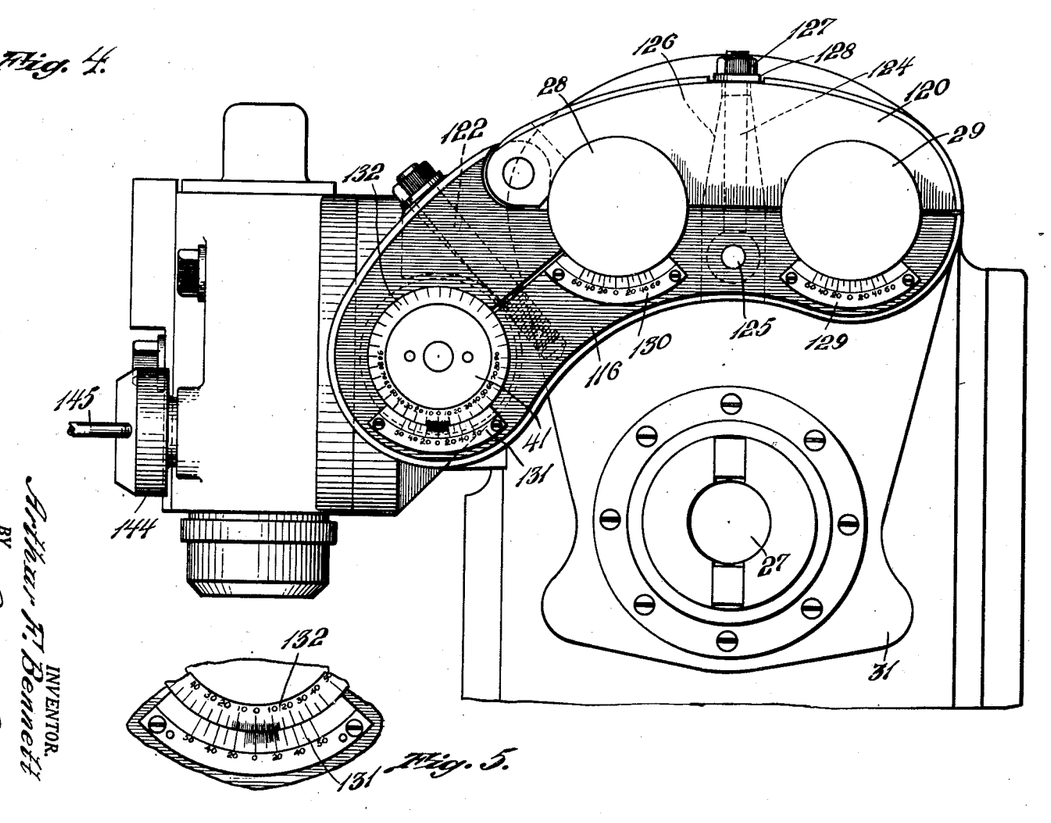
Fig. 4 is a face view of the upper portion of the machine tool with the attachment in its side mounting position.
Fig. 5 is a detail of the aligning indicator.
Figure 6:
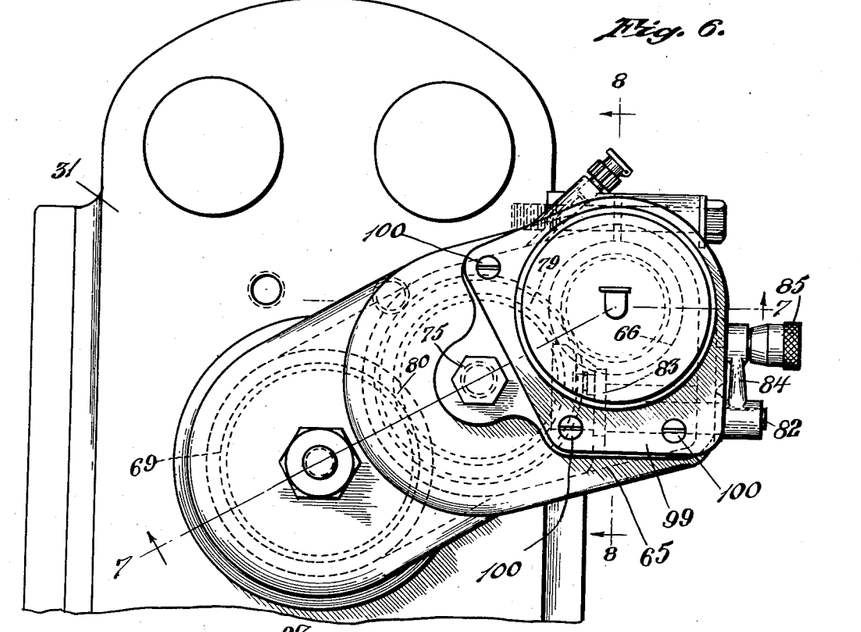
Fig. 6 is an elevational view of the upper portion of the machine tool showing the casing and the driving arrangement for the attachment when in its side mounted position.
Figures 8, 11:
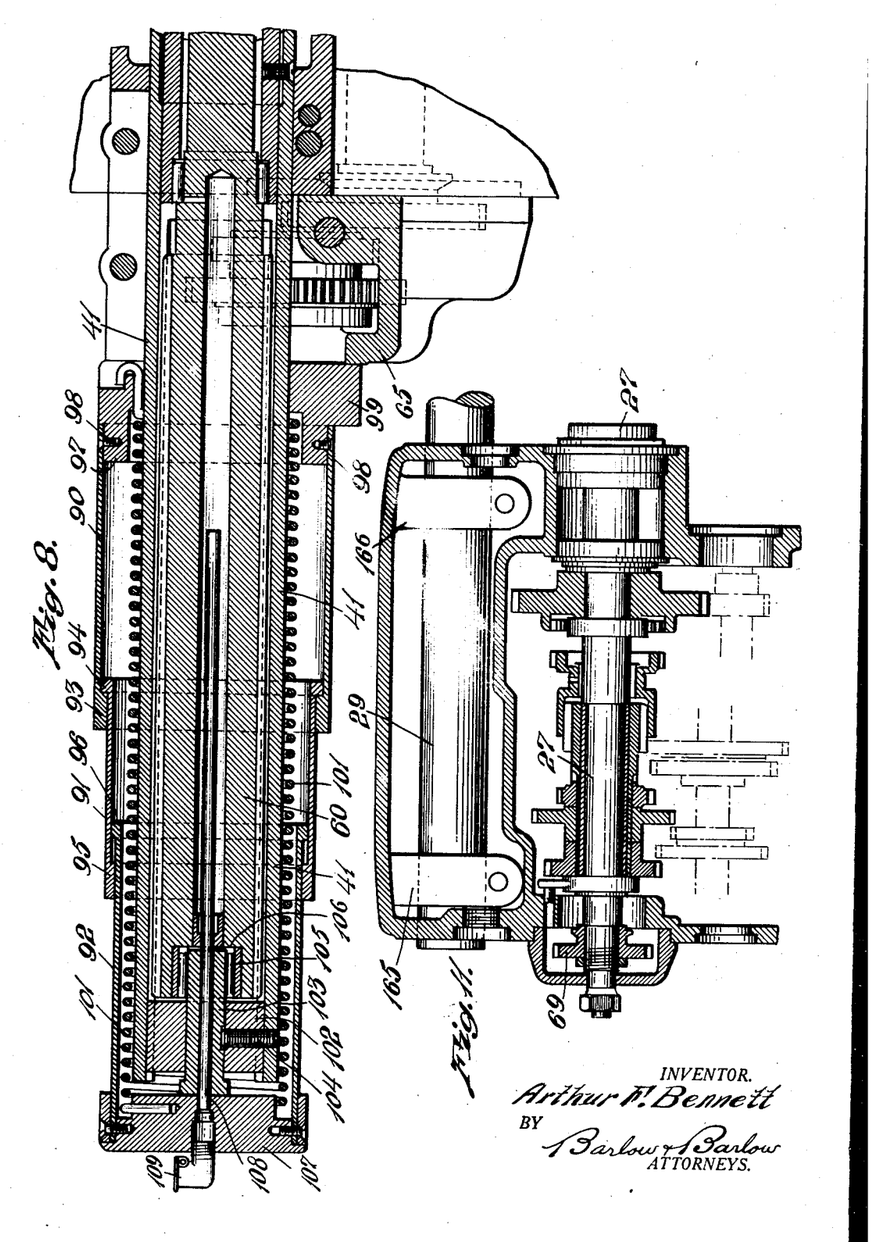
Fig. 8 is a sectional view on line 8—8 of Fig. 6, showing the rear end portion of the attachment and the telescoping portion which covers the same.
Fig. 11 is a sectional view through the upper portion of the machine tool showing the spindle and the additional gear mounted thereon from which the attachment derives its operating movement.

In cases, however, where it is desirable to secure a more rugged support of the attachment when in the position of Fig. 3 or 13, after the attachment has been clamped in the position of the overarm as at 165 and 166, Fig. 11, and angularly aligned by means of the graduations at 132 against the vernier plate 130, Fig. 4, I may securely clamp the attachment spindle in place by means of the usual clamps as 167 and 168 (Fig. 3) and then remove the brace plate 116 and transfer it to the position shown in dotted lines in Fig. 3 between the attachment and the standard where it may receive the overarm 28 in the side mounting bracket when drawn forwardly therefrom. For this purpose the brace may be opened up by removing portion 129 of the brace by removing nut 127 and after the overarms and attachment are in place the whole may be firmly clamped together.

In all of these positions the spindle is free to operate additionally to the attachment.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a machine tool, a standard, a main spindle therein, an overarm, means for supporting from the overarm a part driven from the spindle, an attachment mounted on the side of the standard independent of the overarm and having an attachment drive shaft out of axial alignment with the main spindle, and means for driving the attachment drive shaft from the main spindle.

2. In a machine tool, a standard, a main spindle therein, an overarm, means for supporting from the overarm a part driven from the spindle, an attachment mounted on the side of the standard independent of the overarm and having a drive shaft, means for slidingly mounting the attachment for movement axially of the drive shaft so as to extend forwardly over a work support, and means maintaining continual driving engagement for driving the drive shaft from the main spindle.

3. In a machine tool, a standard, a main spindle therein, an overarm, means for supporting from the overarm a part driven from the spindle, an attachment mounted on the side of the standard independent of the overarm and having a drive shaft out of axial alignment with the main spindle, and means for driving the drive shaft from the main spindle while leaving the main spindle free to function in a normal manner.

4. In a machine tool, a standard, a main spindle therein, an overarm, means for supporting from the overarm a part driven from the spindle, an attachment mounted on the side of the standard independent of the overarm and having a drive shaft, means for slidingly mounting the attachment for movement axially of the drive shaft, and means maintaining continual driving engagement for driving the drive shaft from the main spindle at any of its positions of adjustment.

5. In a machine tool, a standard, a main spindle therein, a bracket on the side of the standard having an opening therein, an attachment having a housing slidably fitting within said bracket opening for axial adjustment with relation thereto and provided with a drive shaft, and means for driving the attachment drive shaft in different positions of adjustment.

6. In a machine tool, a standard, a main spindle therein, a bracket on the side of the standard having an opening therein, an attachment having a housing slidably fitting within said bracket opening for axial adjustment with relation thereto and provided with a drive shaft, and means for driving the attachment drive shaft from the spindle at the rear end thereof in different positions of adjustment.

7. In a machine tool, a standard having a front face, a main spindle in said standard, an attachment slidably mounted at the side of said standard to extend outwardly over a work support when in use and movable to a position rearward with reference to the front face to be completely back of the same for stored position, a drive shaft in said attachment, and means to drive the attachment drive shaft from the spindle in said side position.

8. In a machine tool, a standard, a pair of overarms extending therefrom, an attachment slidably mounted parallel to the axis of one of the overarms, and a brace transversely engaging said attachment and at least one of said overarms to lock the same together.

9. In a machine tool, a standard, a pair of overarms extending therefrom, an attachment slidably mounted parallel to the axis of one of the overarms, and a brace transversely engaging said attachment and at least one of said overarms at their free ends to lock the same together into firm relation.

10. In a machine tool, a standard, overarms extending therefrom, an attachment slidably mounted parallel to the axis of one of the overarms, a brace transversely engaging said attachment and at least one of said overarms to lock the same together, and cooperating means on said brace and attachment for indicating the position of the attachment with reference to a fixed part of the machine.

11. In a machine tool, a standard, overarms extending therefrom, an attachment slidably mounted parallel to the axis of one of the overarms, a brace engaging said attachment and at least one of said overarms to lock the same together, said brace having separable parts hinged together to open from embracing position, and means to clamp said parts together to firmly clamp the parts embraced.

12. In a machine tool, a standard, overarms extending therefrom, an attachment slidably mounted parallel to the axis of one of the overarms and interchangeable therewith, a plate having openings for transversely embracing said attachment and at least one of said overarms, graduations about said openings and on said attachment for aligning said attachment with reference to a fixed part of the machine in any position of said attachment.

13. In a machine tool, a standard having a front face, an attachment slidably mounted at the side of said standard and movable to a position forward or rearward with reference to the front face and having a drive shaft movable therewith and telescoping guards housing the rear end of the attachment drive shaft, and means for collapsing said guards as the attachment is drawn forward.

14. In a machine tool, a main spindle, an attachment having a drive shaft, means for positioning said attachment in a plurality of selected positions with said spindle and shaft out of axial alignment, and a unit comprising a casing containing driving gears, said unit being shiftable to said different positions about the main spindle as a center to drive the said shaft from the main spindle, and said unit having telescoping guards housing the end of the attachment and movable with the unit to different positions of adjustment.

15. In a machine tool, a standard having a plurality of openings, a main spindle in the standard, an attachment having a drive shaft positionable in one of the plurality of selected openings with said spindle and shaft out of axial alignment, and shiftable means for driving said shaft from the main spindle in any of the selected positions.

16. In a machine tool, a standard having a plurality of openings, a main spindle in said standard, an attachment having a drive shaft positionable in one of the plurality of selected openings with said spindle and shaft out of axial alignment, and a unit comprising a casing containing driving gears, said unit being shiftable to said different positions about the main spindle as a center to drive the shaft from the main spindle.

17. In a machine tool, a standard having a plurality of openings, a main spindle in said standard, overarms in certain of said openings, an attachment having a housing in another of said openings, said housing and overarms being interchangeable in said openings, and means for driving said attachment in any of said selected locations from the main spindle.

18. In a machine tool, a standard having a plurality of openings, a main spindle in said standard, overarms in said openings, a bracket at the side of the housing having an opening similar to the openings in said standard, an attachment having a cylindrical housing fitting in said bracket opening, said housing and overarms being interchangeable, and a unit comprising a casing containing driving gears, said unit being shiftable to said different positions about the main spindle as a center to drive the attachment from the main spindle in any opening in which it may be located, said unit being at the back of the standard.

19. In a machine tool, a standard, a main spindle therein, an attachment mounted on the side of the standard and having a drive shaft out of axial alignment with the main spindle, a drive gear on the main spindle, and a driven gear meshing therewith for driving the shaft, and a selective mechanism to move the driven gear to and from mesh with the drive gear.

ARTHUR F. BENNETT.